United States Patent [19]

Fenske et al.

[11] Patent Number: 4,652,746

[45] Date of Patent: Mar. 24, 1987

[54] SYNCHRONIZING DEVICE FOR ELECTRICALLY ACTUATED COUPLING

[75] Inventors: Horst Fenske, Leipzig; Klaus Hertrich, Göhrenz; Rudolf Störr, Karl Marx Stadt, all of German Democratic Rep.

[73] Assignee: Veb Kombinat Polygraph "Werner Lamberz"Leipzig, Leipzig, German Democratic Rep.

[21] Appl. No.: 697,120

[22] Filed: Jan. 30, 1985

[30] Foreign Application Priority Data

May 8, 1984 [DD] German Democratic
Rep. .................................... 2627918

[51] Int. Cl.⁴ .............................................. G01D 5/34
[52] U.S. Cl. ................................ 250/231 SE; 356/395
[58] Field of Search .............. 250/231 SE; 340/347 P; 356/395

[56] References Cited

U.S. PATENT DOCUMENTS 4,554,450 11/1985 Goepel ............................ 356/395 X

FOREIGN PATENT DOCUMENTS 1276658 9/1968 Fed. Rep. of Germany .
2221532 11/1973 Fed. Rep. of Germany .

*Primary Examiner*—Eugene R. LaRoche
*Assistant Examiner*—Robert J. Pascal
*Attorney, Agent, or Firm*—Michael J. Striker

[57] ABSTRACT

A synchronizing device for an electrically actuated coupling automatically coupling structural units of processing machine, includes a driving shaft and a driven shaft and two synchronizing members each connected to the assigned shaft for joint rotation therewith. A light emitter is positioned at the first synchronizing member while a light-conducting cable, receiving light from the light emitter, conducts it to a photoelectric detector connected in an electric circuit which actuates the coupling. The angular position of the first synchronizing member relative to the second synchronizing member is adjusted by clamping elements connecting the first synchronizing member to a driving gear of the driving shaft.

8 Claims, 1 Drawing Figure

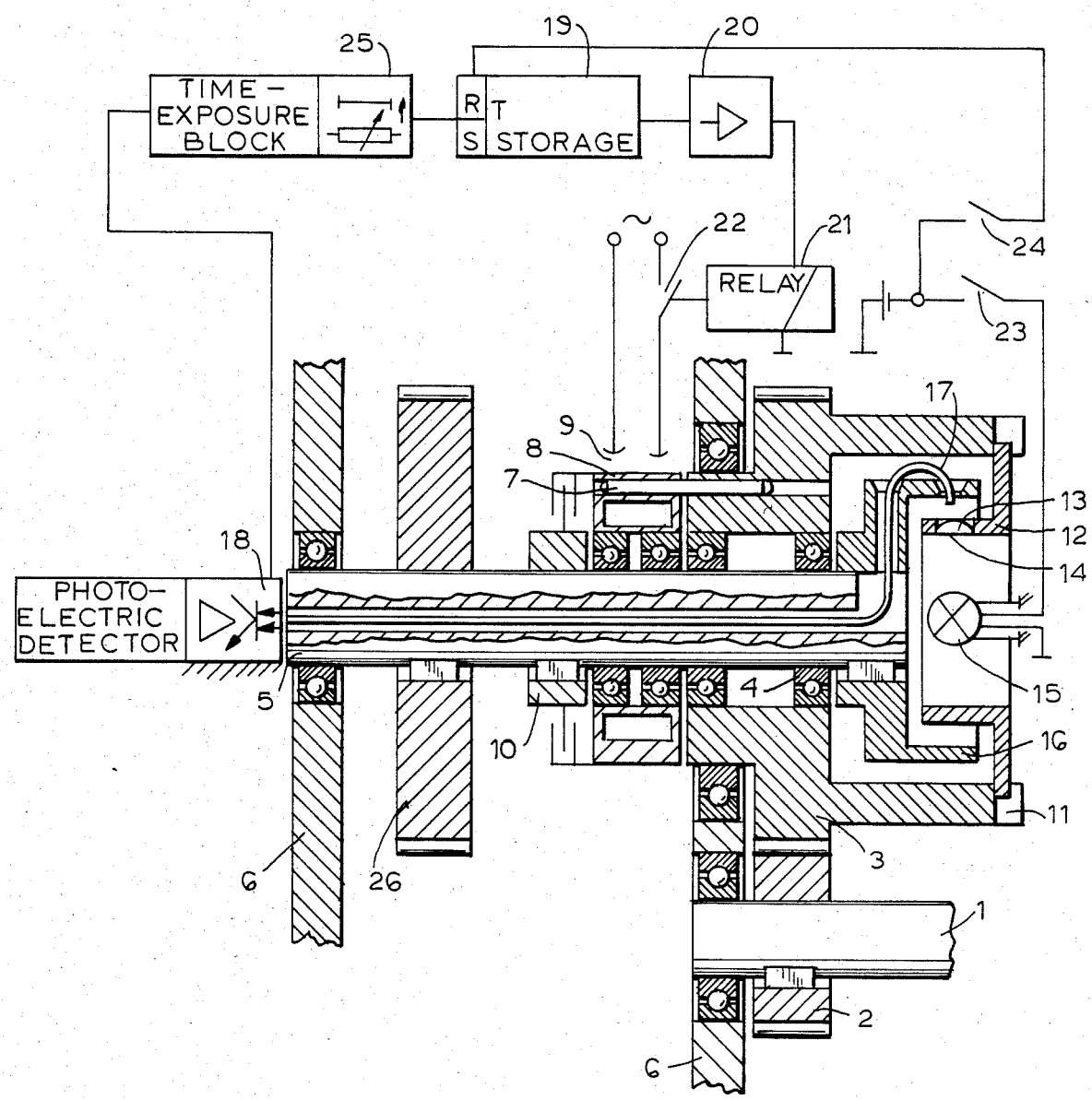

SYNCHRONIZING DEVICE FOR ELECTRICALLY ACTUATED COUPLING

BACKGROUND OF THE INVENTION

The present invention relates to a synchronizing device for an electrically actuated coupling, by which aggregates or structural components of processing or finishing machines can be coupled to each other in a phase-angular position.

A synchronizing device can, for example, be used for an automatic and register-precise coupling of folding devices or transverse cutters of rotating printing machines. According to various operational conditions or various qualifications it is required that processing aggregates be register-precisely coupled to each other and uncoupled from each other. The meaning of the register-precise arrangement is that the edges of, for example the mirrors of the printing units in all the printing mechanisms should exactly superpose one another and the longitudinal and transverse folds and cutting lines should be carried out with high accuracy of fit.

It has been known in the art that the shafts to be coupled with each other should be brought in engagement in a predetermined angular position. Couplings utilized for this purpose have been operated by means of form-locking elements which were brought into engagement with each other in a predetermined position.

DE-AS No. 1,276,658 discloses an overload coupling for a folding apparatus, in which a bevel gear coupling is controlled by two commutator units in connection with running single revolution shafts and by respective sliding rings and brushes abutting the sliding rings. The commutator brushes close the electric circuit in their respective positions whereby an automatic coupling results. The disadvantage of this device resides in that the commutators and sliding brushes are subject to extensive wear and are also expensive in manufacture. Furthermore, the known device offers no possibilities to provide a coupling of the shafts in various angular positions. This is, however, desired in roller-rotary printing machines for registered adjustment of the units.

DE-OS No. 2,221,532, for example, discloses the device in which variable angular positions of the driving shaft and the driven shaft in office machines are possible. However, these various angular positions are possible only in rough steps. In this arrangement a controlled transmitter operates in connection with a multi-stage pawl coupling. The transmitter provides for a number of switch positions distributed over the circumference of the shaft. The pawls are controlled by light switches. The driving-side light barrier controls a timing putting into circuit, which driven-side light barrier controls a timing of switching-off of the pawls via a magnet. Due to the stationary arrangement of both light barriers on the machine frame the switching-on and switching-off points of the shafts relative to the frame are defined in connection with the timing discs. The timing switching-on of the shafts requires, however, a timing switching-off of these shafts. To uncouple the driven shaft from the driving shaft in any angular position and to couple these shafts with each other, upon a next rotation, in a selected angular position a fine sensitive correction of the angular position of the drifen shaft relative to the driving shaft has been required but has not been, however, possible in the known device. Furthermore, in the known device the coupling process has been performed intermittently and therefore all the structural elements of the device have been subject to wear and have generated significant noise in operation.

SUMMARY OF THE INVENTION

It is an object of the present invention to provide an improved synchronizing device for an electrically actuated coupling.

It is another object of this invention to provide a synchronizing device for a coupling, which makes possible a predetermined angular positioning of the shafts being coupled.

Yet another object of this invention is to avoid the disadvantages of conventional couplings of the type under discussion.

Still another object of the invention is to provide a device which would ensure an automatic and register-precise coupling of aggregates or structural components of processing machines via a main shaft. For this purpose the shafts to be coupled are to be brought into engagement in a predetermined angular position relative to each other. Furthermore, this angular position should be varied for various operational conditions to enable a fine register-control via the main shaft.

These and other objects of the present invention are attained by a synchronizing device for an electrically actuated coupling having a driving portion connected to a driving shaft and a driven portion connected to a driven shaft and operated for coupling the driven shaft with the driving shaft in a predetermined angular position relative to each other, the synchronizing device comprising a first synchronizing member connected to the driven shaft for joint rotation therewith, a second synchronizing member connected to the driving shaft for joint rotation therewith, a light emitter surrounded by said first synchronizing member which has a light-conducting opening, a stationary photoelectric detector, an electric circuit for actuating said coupling, said photoelectric detector being connected in said electric circuit, and a light-conducting cable positioned between said second synchronizing member and said detector and conducting light from said light emitter and said opening to said detector whereby signals of said detector are received in said circuit which actuates said coupling.

The first synchronizing member may annularly enclose said light emitter.

The device may further include a driving gear connected to said driving shaft and also connected with said first synchronizing member.

The second synchronizing member may be connected to said driven shaft and be bell-shaped, whereby the second synchronizing member annularly encloses said first synchronizing member.

The driven shaft may be hollow, said light-conducting cable extending from said second synchronizing member through said driven shaft centrally thereof towards said photoelectric detector.

The device may further include clamps connecting said first synchronizing member to said driving gear and operative for a continual adjustment of an angular position of the first synchronizing member relative to the second synchronizing member and for locking the first synchronizing member with said driving gear in an adjusted angular position.

The electric circuit may include a memory and a timing block interconnected in said circuit between the memory and said photoelectric detector, said timing block providing a fine adjustment of the angular position of the driven shaft relative to the driving shaft.

The device may further comprise a focusing optical lens positioned in said opening of the first synchronizing member.

The main advantage of the synchoernizing device according to the present invention resides in that the aggregates or structural units or groups of the machine are automatically and register-precisely coupled by the main shaft. For this purpose, the relative angular position of the driving shaft and the driven shaft of the electrically actuated coupling is adjusted by changing the position of the first synchronizing member relative to the driving gear, for example with the aid of a scale or dial provided on the driving gear, by means of which a desired relative angular position of two synchronizing members can be easily obtained. A fine adjustment of the precise register can be obtained by the adjustment of the timing block arranged in the electric circuit.

The present invention can be utilized in many various constructions. For example, it is conceivable to position the synchronizing members on two discrete shafts. It is possible, for example to set the first synchronizing member and the second synchronizing member in a number-of-revolution ratio with the driving shaft, for the driving shafts which do not rotate with a machine cycle of 360°, and to provide a rotation of the synchronizing members through 360° per one machine cycle.

It is advantageous that the synchronizing device of this invention will not be subject to wear and is continually adjustable to any angular position. The inventive device is not connected to a predetermined field and can be universally adaptable by respectively selecting the dimensions of the coupling.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of drawing schematically illustrates a synchronizing device of the present invention in conjunction with an electro-magnetic friction coupling shown in section.

DETAILED DESCRIPTION OF PREFERRED EMBODIMENTS

Referring now to the drawing in detail, reference numeral 1 designates a drive shaft of the synchronizing device, which shaft is moved by a main shaft of the machine, for example of a non-illustrated roller-rotation-offset printing machine. A pinion 2 is mounted on driving shaft 1, which imparts rotation to a driving gear 3 which surrounds roller bearing 4. A driven shaft 5 is synchronous with the drive shaft of the aggregate, with which the device is to be coupled. The driving shaft 1, as well as the driving gear 3, are positioned in a machine wall 6. The rotation movement of the driving gear 3 is translated, via a tappet or carrying pin 7, to a coupling portion 8 of an electromagnetic or induction coupling 9 which is known per se. Coupling portion 8 is rotationally supported on the driven shaft 5. A driven coupling portion 10 of coupling 9 is rigidly secured to the driven shaft 5.

A first synchronizing member 12 is connected by means of a number of clamps 11 with the driving gear 3. The synchronizing member 12 has a light-conducting opening or perforation 13, in which, preferably, an optical lens is inserted. A light emitter 15 is positioned in the center of the synchronizing member 12, which is bell-shaped. A second and, also bell-shaped, synchronizing member 16, which is rigidly secured to the driven shaft 5, surrounds the first synchronizing member 12.

A light beam, which is transmitted from the light emitter 15 and focused by the optical lens 14, is reproduced on the line of the inner surface of the synchronizing member 16. The end of light-conducting cable 17 is arranged at any place of the inner circumference of the synchronizing member 16. The light-conducting cable 17 extends through the synchronozing member 16 and from there, centrally of the driven shaft 5, towards the left-hand end of the latter. The light beam is transmitted into the cable 17. A photoelectric detector 18, which is rigidly connected to the machine frame, is mounted at the end of driven shaft 5 to detect light from cable 17. Amplified signals of the photoelectric detector or receiver 18 are supplied to an electric circuit of a logic switch device which is conventional. A memory 19, which may be formed preferably as a bistable multivibrator, an amplifier 20 and a relay 21 are connected in series to the photoelectric detector 18. A switch 22 of the relay 21 actuates the coupling 9. In order to momentarily start the light transmitter 15, the latter is periodically connected with a non-shown electric current source, whereas for erasing the signal in memory 19, a further switch contact 24 is provided. A time block 25, also of conventional design, is inserted in the electric circuit between the photoelectric detector 18 and memory 19.

A further driven gear 26, which is synchronous with the driving gear of the aggregate to be coupled to the synchronizing device, is mounted on the driven shaft 5.

After programming, the switch contact 23 is actuated by hand or mechanically, for coupling the machine aggregates with the driving shaft, whereby the light emitter 15 connected to switch contact 23, during the movement of the driving gear 3 and thereby of the synchronizing member 12, becomes energized, so that light, transmitted from the light emitter 15 through the optical lens 14 during the next angular step, appears in the light-conducting cable 17 in the synchronizing member 16 which is stationary at the moment. The light-conducting cable 17 conducts light to the stationary photoelectric detector 18. The latter controls relay 21 via memory 19 and amplifier 20, and the electric circuit for the induction coupling 9 becomes closed via switch 22. In accordance with a time constant of the coupling process and a predetermined number of revolutions of the coupling, the switch point in time of the registered-precise angular position is established, and a reproducible coupling condition in a desired angular coordination is ensured. For uncoupling the coupling the signal still contained in the memory 19 is merely erased by the actuating of the switch contact 24.

The change in the angular position of the synchronizing member 12 relative to the driving gear 3 takes place after the release of clamps 11 with the aid of a not-shown scale applied to the connecting portion of the driving gear 3, and after a repeated adjustment the shift of the switching point for defining the angular position of the driven shaft 5 is performed, and this results in a registered adjustment of the main shaft relative to the machine aggregate to be driven. A further adjustment of this angular position, for example for a fine adjustment of the register, is provided by the variably adjustable time block 25 which is adjusted in the electric circuit to the relay 21; then, under the assumption of a predetermined number of revolutions of the coupling, a time shift of the signal to a desired fine-adjustable registered displacement takes place.

It is of course understood that light emitter 15, photoelectric detector 18, timing block 25, storage or memory 19, amplifier 21 and timing relay 21, as well as switch contacts 22, 23, 24 are of any suitable conventional constructions available on the market and known to anyone skilled in the art.

It will be understood that each of the elements described above, or two or more together, may also find a useful application in synchronizing devices for induction couplings differing from the types described above.

While the invention has been illustrated and described as embodied in a synchronizing device for an induction coupling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims.

What is claimed is:

1. A synchronizing device for an induction coupling having a driving shaft and a driven shaft and operated for coupling the driven shaft with the driving shaft in a predetermined angular position relative to each other, the synchronizing device comprising a first synchronizing member connected to the driven shaft for joint rotation therewith; a second synchronizing member connected to the driving shaft for joint rotation therewith; a light emitter surrounded by said first synchronizing member which has a light-conducting opening; a stationary photoelectric detector; an electric circuit for actuating said coupling, said photoelectric detector being connected in said electric circuit; and a light-conducting cable positioned between said second synchronizing member and said detector and conducting light from said light emitter through said opening to said detector whereby signals of said detector are received in said circuit which actuates said coupling.

2. The device as defined in claim 1, wherein said first synchronizing member annularly encloses said light emitter.

3. The device as defined in claim 2, further including a driving gear connected to said driving shaft and also connected with said first synchronizing member.

4. The device as defined in claim 3, wherein said second synchronizing member is connected to said driven shaft and is bell-shaped, said second synchronizing member annularly enclosing said first synchronizing member.

5. The device as defined in claim 4, wherein said driven shaft is hollow, said light-conducting cable extending from said second synchronizing member through said driven shaft centrally thereof towards said photoelectric detector.

6. The device as defined in claim 5, further including clamps connecting said first synchronizing member to said driving gear and operative for a continual adjustment of an angular position of the first synchronizing member relative to the second synchronizing member and for locking the first synchronizing member with said driving gear in an adjusted angular position.

7. The device as defined in claim 6, wherein said electric circuit includes a memory and a timing block interconnected in said circuit between the memory and said photoelectric detector, said timing block providing a fine adjustment of the angular position of the driven shaft relative to the driving shaft.

8. The device as defined in claim 1, further including a focusing optical lens positioned in said opening of the first synchronizing member.

* * * * *